United States Patent
Ono et al.

(10) Patent No.: US 7,614,076 B2
(45) Date of Patent: Nov. 3, 2009

(54) BROADCAST RECEIVING DEVICE AND STREAM OUTPUT DEVICE

(75) Inventors: Chiyo Ono, Fujisawa (JP); Kenji Wada, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 778 days.

(21) Appl. No.: 10/969,800

(22) Filed: Oct. 19, 2004

(65) Prior Publication Data

US 2005/0123277 A1    Jun. 9, 2005

(30) Foreign Application Priority Data

Dec. 3, 2003    (JP) .............................. 2003-403967

(51) Int. Cl.
H04N 7/16    (2006.01)
H04N 7/00    (2006.01)
H04N 5/91    (2006.01)

(52) U.S. Cl. .......................... 725/142; 386/46; 386/94

(58) Field of Classification Search .................. 725/31, 725/142; 386/46, 94
See application file for complete search history.

(56) References Cited

U.S. PATENT DOCUMENTS

| | | | |
|---|---|---|---|
| 5,651,064 | A | 7/1997 | Newell |
| 6,256,390 | B1 * | 7/2001 | Okuyama et al. ............ 380/201 |
| 6,839,503 | B1 * | 1/2005 | Hirai ............................ 386/94 |
| 6,850,691 | B1 * | 2/2005 | Stam et al. ..................... 386/68 |
| 6,947,663 | B1 * | 9/2005 | Koda et al. ................... 386/124 |
| 6,981,272 | B1 | 12/2005 | Morinaga et al. |
| 7,039,614 | B1 * | 5/2006 | Candelore ..................... 705/57 |
| 7,043,138 | B1 * | 5/2006 | Wakahara et al. ............. 386/83 |
| 2002/0114462 | A1 | 8/2002 | Kudo et al. |
| 2002/0129371 | A1 * | 9/2002 | Emura et al. .................. 725/61 |
| 2003/0074660 | A1 * | 4/2003 | McCormack et al. .......... 725/2 |
| 2003/0086695 | A1 | 5/2003 | Okamoto et al. |
| 2003/0149886 | A1 | 8/2003 | Ito et al. |
| 2003/0215210 | A1 * | 11/2003 | Yamazaki ..................... 386/40 |
| 2003/0231334 | A1 * | 12/2003 | Nagai et al. ................. 358/1.14 |
| 2003/0233665 | A1 * | 12/2003 | Tsujino et al. ............... 725/134 |
| 2004/0068740 | A1 * | 4/2004 | Fukuda et al. ................ 725/45 |
| 2004/0261093 | A1 * | 12/2004 | Rebaud et al. ................ 725/25 |
| 2005/0123276 | A1 * | 6/2005 | Sugaya ........................ 386/94 |
| 2006/0034584 | A1 * | 2/2006 | Kim et al. ..................... 386/52 |

FOREIGN PATENT DOCUMENTS

| | | |
|---|---|---|
| JP | 2002-238023 | 8/2002 |
| JP | 2003-101529 | 4/2003 |

* cited by examiner

*Primary Examiner*—Brian T Pendleton
*Assistant Examiner*—Ryan Stronczer
(74) *Attorney, Agent, or Firm*—Townsend and Townsend and Crew LLP

(57) ABSTRACT

A broadcast receiving device configured to receive broadcasted digital programs includes a tuner to select a channel from a plurality of channels, so that a desired digital program may be received via the selected channel; a recording component to record the received program and copy control information associated with the received program; a digital terminal to output the program recorded on the recording component to a video recording device coupled to the digital terminal; and a controller to control the output of the recorded program to the video recording device that is coupled to the digital terminal. The recorded program is not output via the digital terminal if more than one video recording device is coupled to the digital terminal and if the copy control information of the recorded program imposes restriction on copying of the recorded program.

16 Claims, 5 Drawing Sheets

One structure example of this system

Sample block structure for STB

Sample block structure for DVTR

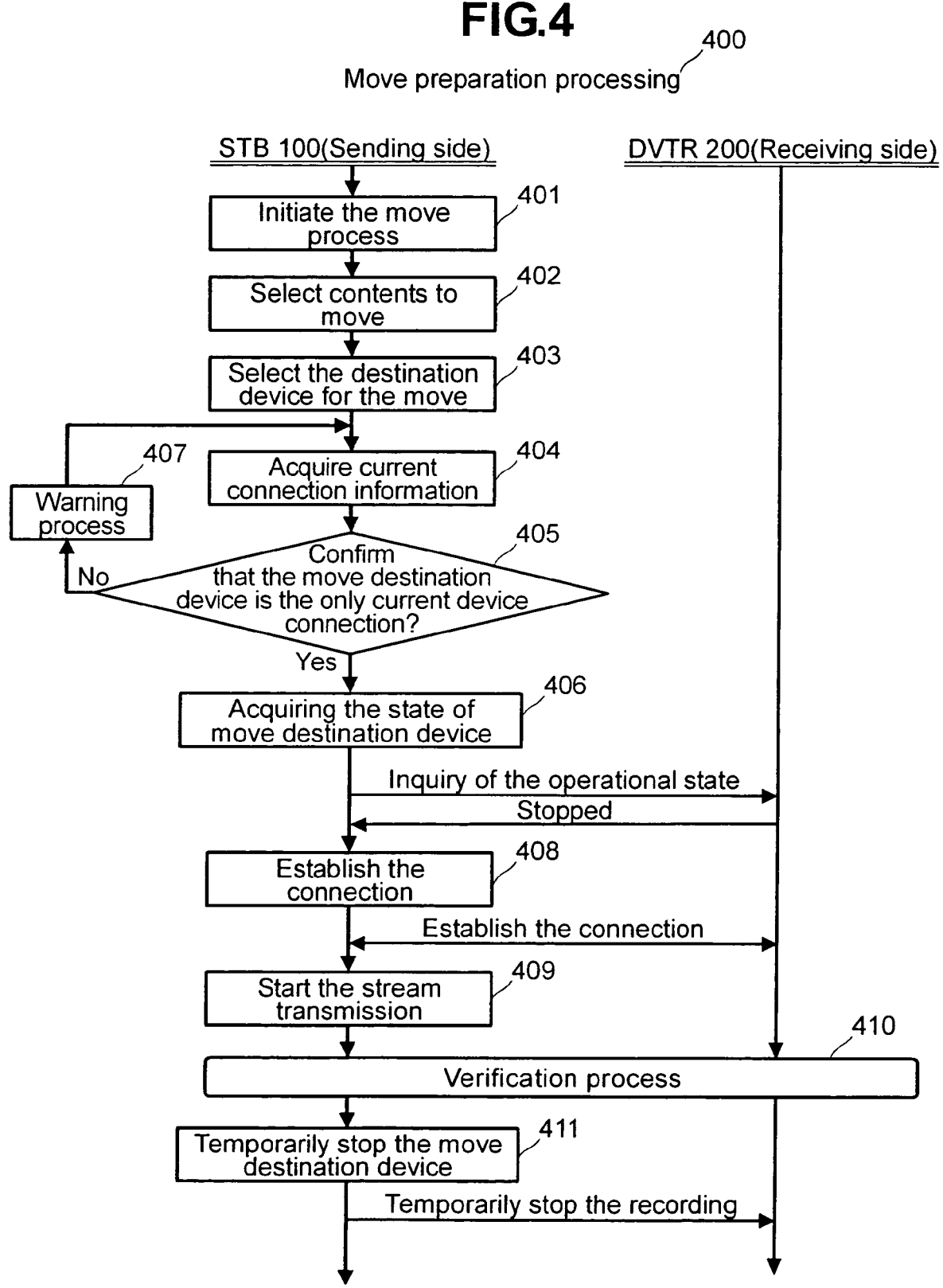

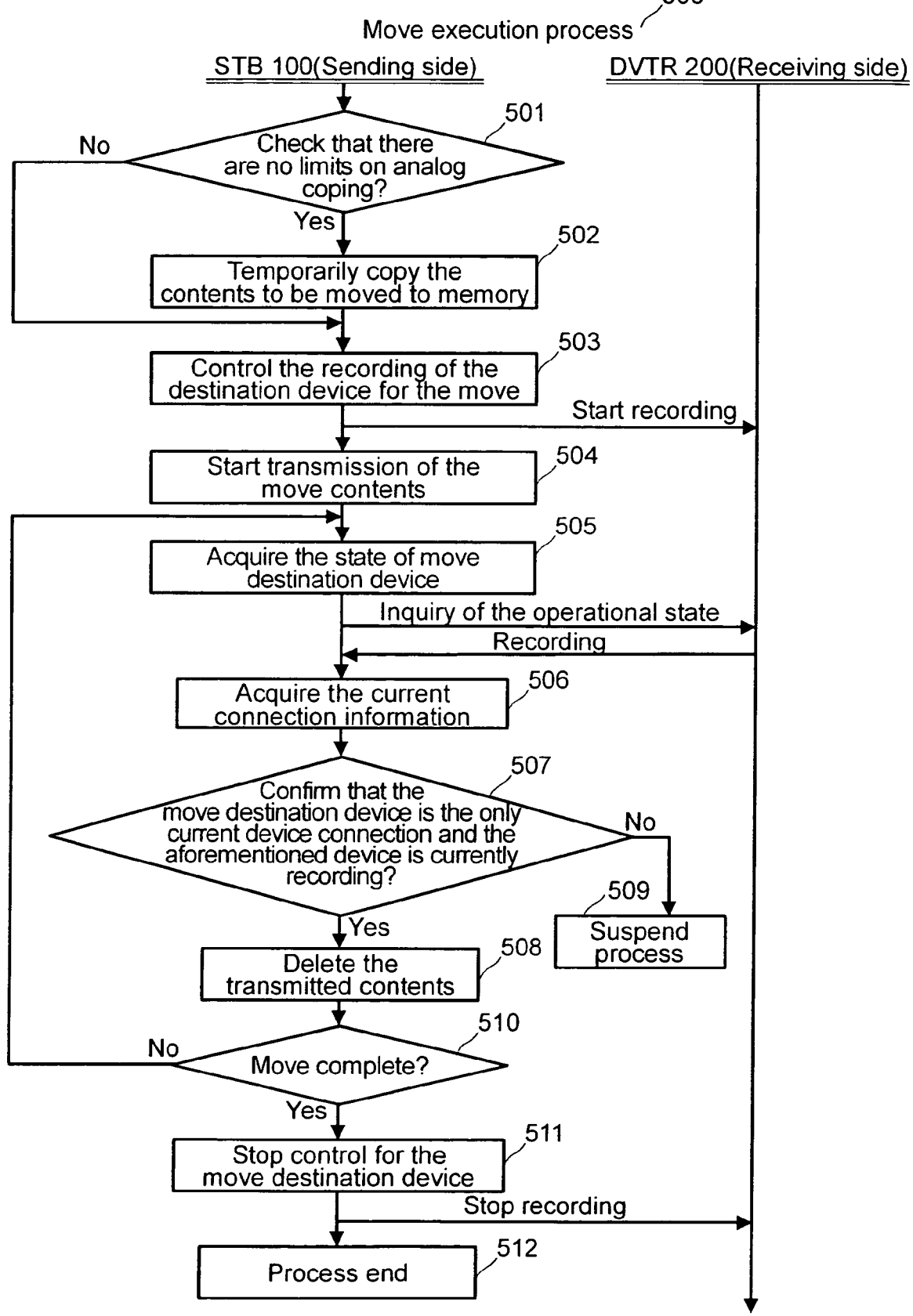

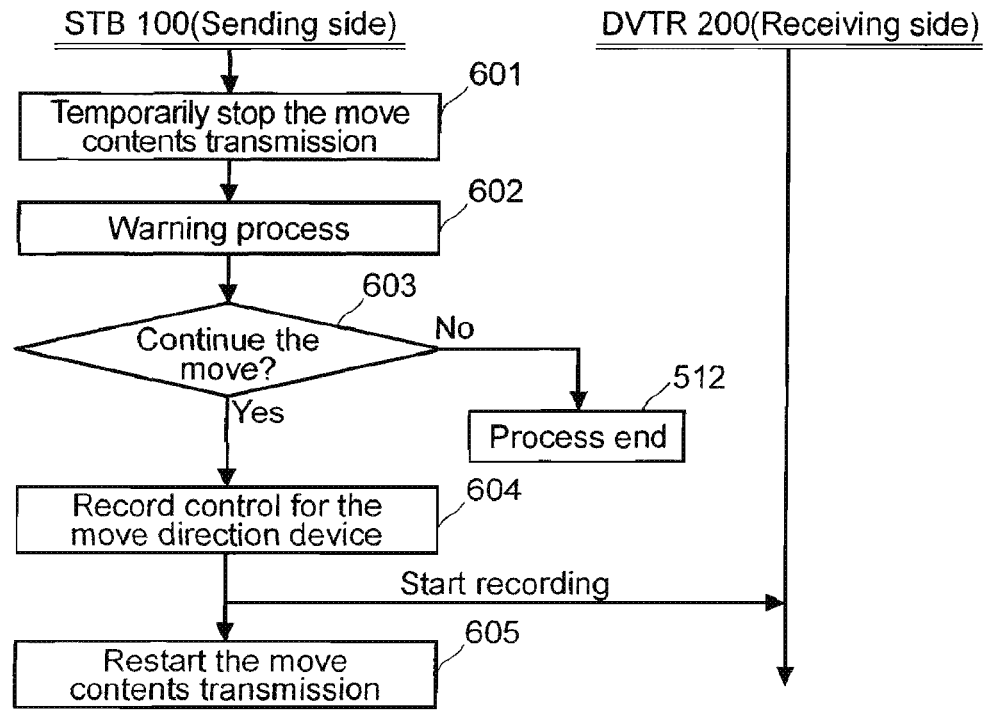
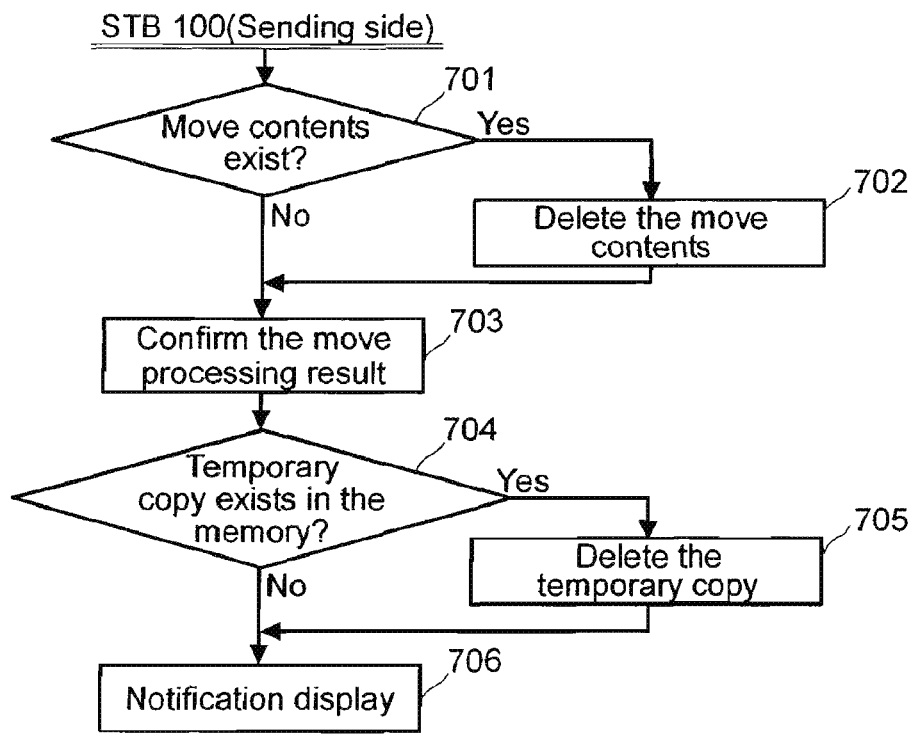

FIG.8

Sample screen that is displayed
at the time of move failure

```
Error occurred during the move
execution.
The recording operation has
been terminated.

Next
```
800

```
Choose a process from the below (1) Restart the move
(2) Delete the digital content and
    view the program in analog.
```
801

FIG.9

List for move processing object device

900

| Category | Name of Manufacturer | Name of Model |
|---|---|---|
| DVTR | Company A | A100 |
| DVD | Company B | B200 |
| DVD | Company B | B300 |
| ... | ... | ... |

BROADCAST RECEIVING DEVICE AND STREAM OUTPUT DEVICE

CROSS-REFERENCES TO RELATED APPLICATIONS

The present application claims priority to Japanese Patent Application No.2003-403967, filed on Dec. 3, 2003.

BACKGROUND OF THE INVENTION

The present invention relates to a broadcast receiving device for receiving broadcasts such as digital broadcasts, and a stream output device for recording and playback of stream data such as digital video/audio signals.

With the recent development of digital video signal processing, settop boxes (STBs) for reception of satellite broadcasts, digital AV apparatuses such as digital VTR (DVTR) for recording and playback of digital broadcast programs, and disk recorders have been manufactured successively. As a digital interface which is most suitable for transmitting video/audio signals while keeping the digital signal format between these digital AV apparatuses, a high speed serial bus (hereinafter referred to as a "1394 bus") is available as defined by IEEE 1394 standards. Stream and control commands can be simultaneously transmitted/received on the 1394 bus, and as stream transmission/reception control and control commands, IEC61883 standards and the AV/C command set are provided.

As a technique for prevention of the unauthorized copying of contents, a DTCP (Digital Transmission Contents Protection) specification has been adopted in the 1394 bus. In the DTCP specification, the video/audio stream is assigned with copy control information describing conditions for copying and data copying is sorted into any of three modes of "copy free" (unlimited copying), "copy never" (copying prohibited), and "copy one generation" (single copying enabled). The recording apparatus such as digital VTR is permitted to receive and record only a stream subject for "copy free" or "copy one generation." As for the latter, after recording a stream subject to "copy one generation", the copy control information is changed to "no more copies" (copying disabled), thus inhibiting other recording apparatuses from recording the contents any further.

On the other hand, a stream recording/playback apparatus such as a so-called hard disk drive (HDD) recorder has recently become available for recording video/audio stream data using a hard disk drive (HDD). Due to the fact that the disk capacity in the apparatus in the case of a HDD recorder is limited, if the free disk space decreases, the user must transfer the contents to be stored to a VTR or optical disk device to be stored in a storage medium such as a tape or optical disk.

For this reason, in the DTCP specification, the contents once recorded in the recording medium as "no more copies" are copied to another recording medium and consequently deleted from the original recording medium or playback is disabled. This function of transferring the contents is defined as a "move function". This move function can be executed only with a built-in or digitally connected single recording medium and it is prohibited that the contents with a length exceeding 1 minute are in a playback-enabled state at both the move source device and the move destination device during the move operation. A technology for mounting the move function was described in the following patents:

BRIEF SUMMARY OF THE INVENTION

In the afore the DTCP specification, if the contents described as "no more copies" are moved to another digitally connected stream recording/playback apparatus, the operation must be executed only for a single recording medium. Therefore, it is important to have such a mechanism so that unauthorized copying of the contents to a device other than the move destination device can be prohibited. However, when the move function is executed, a variety of unexpected situations can occur including the case when verification with another device has already been completed prior to the initiation of the move and the case when the move destination device is remotely controlled by another device during the move operation; thus, special care must be taken when mounting.

In addition, the contents at the move source will be deleted or playback will be disabled at the end of the move so that if the move fails due to insufficient space in the recording medium or a mis-operation, users can no longer playback the contents.

The embodiments of the present invention provide a stream data recording/playback apparatus having a move function which can be executed more robustly for users and is configured to be mounted more easily.

In one embodiment, if a device other than the move source device is connected before initiation of the move, the initiation of the move is prohibited until achieving a status wherein only the move source device is connected. If another device is connected during the execution of the move, the move operation is stopped temporarily and after confirming such a state that only the move source device is connected, the move operation is restarted. As a result, the situation that contents are received by multiple devices at the same time can be easily avoided.

The contents subject to the move are temporarily stored in another memory which is not accessible externally prior to initiation of move, and if the move is successful, the contents are deleted from the memory after completing the move. If the move fails due to disconnection, the contents can be recovered by analog regeneration from the memory with some restrictions. As a result, the contents are not lost and can be played even if the move is not successful.

In one embodiment, a broadcast receiving device configured to receive broadcasted digital programs includes a tuner to select a channel from a plurality of channels, so that a desired digital program may be received via the selected channel; a recording component to record the received program and copy control information associated with the received program; a digital terminal to output the program recorded on the recording component to a video recording device coupled to the digital terminal; and a controller to control the output of the recorded program to the video recording device that is coupled to the digital terminal. The recorded program is not output via the digital terminal if more than one video recording device is coupled to the digital terminal and if the copy control information of the recorded program imposes restriction on copying of the recorded program.

In another embodiment, a video device includes a recording component to record a video program received from an external source, the video program being recorded with copy control information; a digital terminal to output the video program recorded on the recording component to an external video recording device coupled to the digital terminal; a controller to control the output of the recorded program to the external video recording device that is coupled to the digital terminal; and a recording medium that stores a list of authorized external video recording devices to which the recorded program may be moved by the video device. The recorded program is prevented from being moved to the external video recording device that is coupled to the digital terminal if the external video recording device is not included in the list.

In yet another embodiment, a method for operating a digital video streaming device includes receiving a video program from an external source, the video program being associated with copy control information; recording the video program and copy control information to a recording medium of the streaming device; and determining whether or not an external video recording device coupled to a digital terminal of the streaming device is an authorized device by accessing a list of authorized devices.

BRIEF DESCRIPTION OF THE DRAWINGS

FIG. 4 shows a flowchart showing the initial procedures of a move process between the broadcast receiving device and the digital VTR according to an embodiment of the present invention.

FIG. 5 shows a flowchart showing the execution procedures of a move process between the broadcast receiving device and the digital VTR according to an embodiment of the present invention.

FIG. 6 shows a flowchart showing the interrupt procedures of a move process between the broadcast receiving device and the digital VTR according to an embodiment of the present invention.

FIG. 7 shows a flowchart showing the end procedures of a move process between the broadcast receiving device and the digital VTR according to an embodiment of the present invention.

FIG. 8 shows an example screen displayed in the case when a move process fails in the broadcast receiving device according to an embodiment of the present invention.

FIG. 9 shows a configuration example of the list of the devices subject to the move process loaded in the broadcast receiving device according to an embodiment of the present invention.

DETAILED DESCRIPTION OF THE INVENTION

Embodiments of the present invention will be described below with reference to the accompanying drawings.

Example 1

Figure 1:
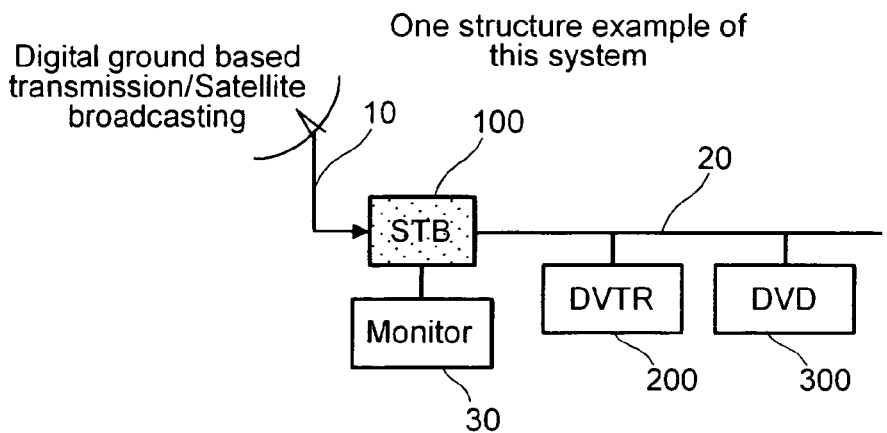
FIG. 1 shows a configuration example of the system as an embodiment of the present invention.

FIG. 1 is an example for explaining the present invention and shows an AV system containing multiple stream recording/playback apparatuses. In the AV system, a broadcast receiving device (STB) 100, a digital VTR (DVTR) 200, DVD recorder (DVD) 300 are digitally connected by the 1394 bus 20. A monitor 30 is connected to STB 100 by analog connection.

With STB 100, a broadcast program, is received with control commands by the antennas 10 to be played on the monitor 30. The broadcast program and copy commands (or copy control information) can be stored in a built-in recording memory. In addition, the digital outputs and control commands of the broadcast program can be transmitted via the 1394 bus 20 to other DVTR 200 and DVD 300.

The DVTR 200 and DVD 300 can record the broadcast program received via the 1394 bus 20 with a removable recording disk.

Figure 2:
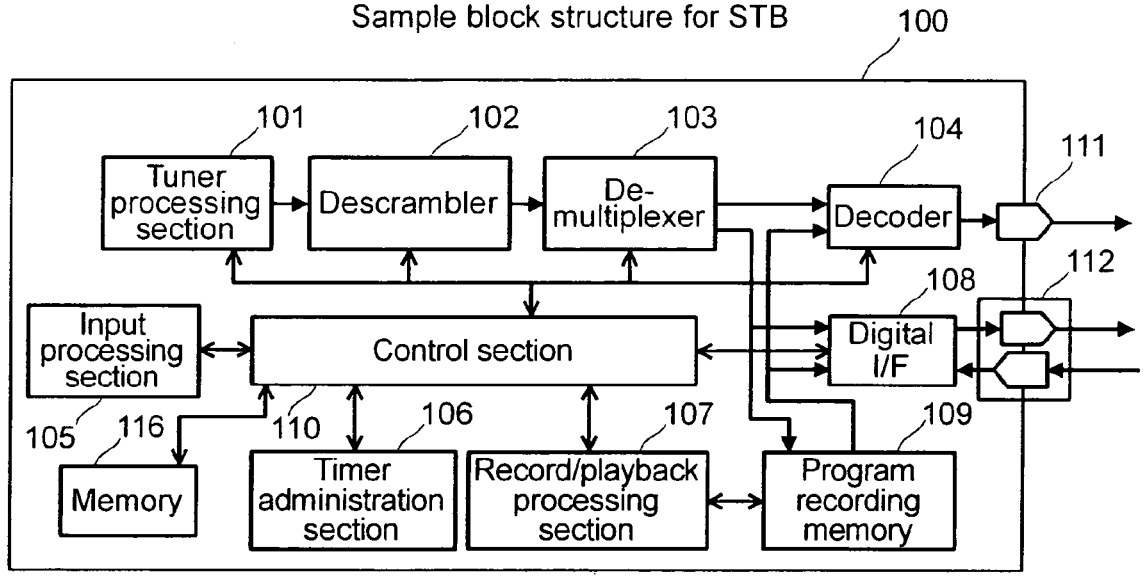
FIG. 2 shows a block configuration example of the broadcast receiving device (STB) according to an embodiment of the present invention.

Next, using FIG. 2, a configuration example of the STB in FIG. 1 will be explained. STB 100 is comprised of a tuner processing unit 101, a descrambler 102, a de-multiplexer 103, a decoder 104, an input processing unit 105, a timer management unit 106, a recording/playback processing unit 107, a digital I/F 108, a program recording memory 109, a control unit 110, an analog output terminal 111, and a digital I/O terminal 112.

The tuner processing unit 101 selects a desirable channel from multiple channels received from a broadcasting station and demodulates the program which has been digitally modulated. The descrambler 102 cancels the scrambled signal of the broadcasted programs applied so that only the channels subscribed from the service provider are receivable. The de-multiplexer 103 extracts audio data and video data from the broadcasted programs.

The decoder 104 decodes the compressed audio data and video data which will be expanded to the original audio signals and video signals. These signals can be output to the outside such as the monitor 30 via the analog output terminal 111. The input processing unit 105 is the section where a user operates the STP 101 using a remote control or touch panel. The timer management unit 106 manages the current time information and timer reservations of the broadcasted programs. The recording/playback processing unit 107 controls recording of the received broadcasted programs in the program recording memory 109 and controls playback for reproducing broadcasted programs recorded in the program recording memory 109.

The digital I/F 108 transmits AV stream and control commands with other AV apparatuses (e.g., DVTR 200 and DVD 300) connected by the 1394 bus 20 via the digital I/O terminal 112, and performs coding of the transmitted AV stream or decoding of the coded AV stream. The program recording memory 109 is a memory to record broadcasted programs. It can be provided in the form of a magnetic disk, optical disk, memory card and their combined hybrid modes. The control unit 110 is a unit to control operations at various units in the STB 100.

Figure 3:
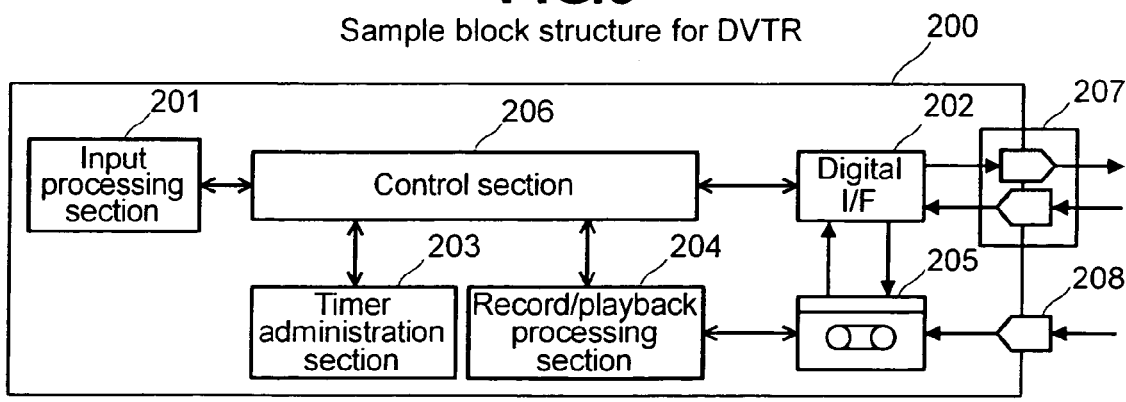
FIG. 3 shows a block configuration example of the digital VTR (DVTR) according to an embodiment of the present invention.

Similarly, a configuration of the DVTA 200 will be explained using FIG. 3. DVTR 200 is comprised of an input processing unit 201, a digital I/F 202, a timer management unit 203, a recording/playback processing unit 204, a recording memory 205, a control unit 206, a digital I/O terminal 207, and an analog input terminal 208. The input processing unit 201 is the area where a user operates the DVTR 200 using a remote control or a touch panel.

The digital I/F 202 transmits AV stream and control commands with other AV apparatuses (e.g., STV 100 and DVD 300) connected by the 1394 bus 20 via the digital I/O terminal 207, and also performs coding of the transmitted AV stream and decoding of the coded AV stream.

The timer management unit 203 manages the current time information and the timer reservations of the broadcasted programs. The recording/playback processing unit 204 controls a stream received via the digital I/O terminal 207 or the analog input terminal 208 in the recording memory 205, and also controls playback for playing a stream recorded in the recording memory 205. In the case of DVTR, this is a magnetic disk. The control unit 206 is a unit to generally control operations at various units in the EVTR 200. DVD 300 has the same configuration as DVTR 200 except that the recording memory 205 of the DVTR 200 is an optical disk.

Next, among the AV systems shown in FIG. 1, the procedures to transfer the broadcasted program recorded in the program recording memory 109 of the STB 100 to the recording memory 205 of the DVTR 200 via the 1394 bus 20 will be described below.

Initially, the procedures required when the STB 100 starts a transfer process with DVTR 200 will be explained using FIG. 4. When a user instructs a transfer process via the input processing unit 105 of the STP 100, the control unit 110 starts a transfer process program (Step 401). The control unit 110 extracts the contents for "no more copies" stored in the program recording memory 109 and displays the extracted information on the monitor 30 for the user to select the contents to be transferred via the input processing unit 105 (Step 402). Subsequently, the control unit 110 displays all the stream recording devices registered in the STB 100 on the monitor 30 for the user to select a stream recording device (DVTR 200 in this case) at the transfer destination via the input processing unit 105 while it informs the user to disconnect devices other than DVTR 200 (DVD 300 in this case) by displaying a message on the monitor 30 (Step 403). When the user disconnects the DVD 300 and is instructed to go forward to the next step, the control unit 110 acquires information in the AV apparatus which is currently located on the 1394 bus 20 via the digital I/F 108 (Step 404) and checks whether only the DVTR 200 is currently connected on the 1394 bus 20 (Step 405). If only DVTR 200 is present, a status acquisition command is issued on the 1394 bus 20 via the digital I/F 108 in order to acquire a current status (Step 406). If other devices in addition to the DVTR 200 are connected, a message is displayed on the monitor 30 again to give a warning or notification to the user to disconnect all devices other than DVTR 200 to further proceed with the transfer process (Step 407).

If the status of the DVTR 200 acquired at Step 406 shows a currently stopped state, a connection is established between the digital I/F 108 of the STB 100 and the digital I/F 202 of the DVTR 200 in order to send a stream based on the stream copying protocol of the IEC61883 standards (Step 408). Based on the DTCP specification, it starts transmitting the stream as "copy one generation" (can be an empty packet) on the 1394 bus 20 via the digital I/F 108. Once the digital I/F 202 of the DVTR 200 at the reception side receives the stream, it requests authentication for the digital I/F 108 of the STB 100 and executes mutual authentication between the STB 100 and the DVTR 200. If the authentication is successful, the coded stream transmitted from the STB 100 can be correctly decoded by the DVTR 200 (Step 410). In order to change the DVTR 200 in a recording temporarily stopped state, a recording temporarily stop command is issued on the 1394 bus 20 (Step 411).

Next, a process 500 for executing a transfer between the STB 100 and the DVTR 200 will be explained by referring to FIG. 5. The control unit 110 of the STB 100 checks whether the contents subject to the move in transfer as selected at Step 402 in FIG. 4 is restricted for copying in the analog system (Step 501). If there is no restriction, the contents are temporarily copied to an area which can not be accessed externally on the program recording memory 109 or a separate memory (Step 502). In order to set the DVTR 200 in a recording start state, a recording start command is issued on the 1394 bus 20 (Step 503). After confirming that the DVTR 200 has started recording, the contents subject to the move for "copy one generation" are transmitted to the 1394 bus 20 via the digital I/F 108 (Step 504).

Once the transfer execution has begun, the control unit 110 of the STB 100 periodically issues a status acquisition command for the DVTR 200 to acquire the operational status of the DVTR 200 (Step 505). The information of the AV apparatus currently located on the 1394 bus 20 via the digital I/F 108 is acquired (Step 506). In addition, it always checks whether the DVTR 200 is currently recoding and no other devices besides the DVTR 200 are currently connected on the 1394 bus 20 (Step 507). In addition, the contents which have already been transmitted are periodically deleted or disabled for playback (Step 508).

If the capacity of the recording memory 205 set in the DVTR 200 runs out in the middle or if the operational status of the DVTR 200 is shifted to a status other than recording when a user mistakenly operates the DVTR 200 by a remote control, an interrupt process is executed (Step 509). The details of the interrupt process will be explained below by referring to FIG. 6.

Once all the contents to be moved are transmitted (Step 510), the STB 100 issues a stop recording command on the 1394 bus 20 in order to stop the recording status of the DVTR 200 (Step 511) and executes a stop process (Step 512). The details of the end process will be explained below by referring to FIG. 7.

In Step 509, a user may accidentally operate the STB 100 using a remote control in addition to the DVTR 200 to stop transmission of the contents. Regarding the dubbing process other than the transfer process ("copy free contents"), the transmission stop of the contents can be instructed by remote operation during the dubbing. In contrast, regarding the transfer process, there is a method of avoiding instruction to stop transmission of the contents by remote controlled operation while executing the transfer process.

Next, the procedures to interrupt the transfer process of the Step 508 will be explained by referring to FIG. 6. As mentioned above, if the operational status of the DVTR 200 as the transfer source device shifts to a status other than recording for some reason, as mentioned above, the STB 100 temporarily stops transmission of the contents to the 1394 bus 20 (Step 601), and a message saying that the transfer process has been interrupted is displayed on the monitor 30 to inform the user (Step 602). After applying necessary processes such as setting another recording memory 205 in the DVTR 200, when the user instructs continuation of the move process via the input processing unit 105 (Step 603), the control unit 110 of the STB 100 issues a resume recording command in order to keep the DVTR 200 in a recording state (Step 604) to reopen the transmission of the contents on the 1394 bus 20 (Step 605). If the user does not instruct the continuation of the transfer process at Step 602 or if an instruction from the user is not input for a certain period, the process shifts to an end process 512.

When another device (e.g., DVD 300) is connected on the 1394 bus 20 during the move operation and the bus is reset, the same process as the interrupt process 508 is executed. Specifically if the STB 100 detects the occurrence of a bus reset, the control unit 110 acquires information of the AV apparatus currently located on the 1394 bus 20 via the digital I/F 108 to confirm that only the DVTR 200 is connected. If another device besides the DVTR 200 is detected to be connected, a stop recording temporarily command is issued in order to stop the recording status of the DVTR 200 and the interrupt process 508 is executed.

Next, the procedures necessary when the STB 100 ends the transfer process with the DVTR 200 at the Step 512 will be explained by referring to FIG. 7.

The control unit 110 of the STB 100 confirms that the contents transferred are not present in the program recording memory 109 (Step 701). In this case, even if a portion of the contents transferred is present, all the contents are deleted or playback is disabled (Step 702).

Subsequently, it confirms the execution results of the transfer process (Step 703) and checks whether the copy of the contents is present in the area which is not accessible externally on the program recording memory 109 or in another memory at the Step 502 (Step 704). Finally, the execution results of the transfer process are informed on the monitor 30 to the user (Step 706).

If the transfer process is successful at Step 703 and a copy of the contents is present at Step 704, the copy is deleted (Step 705) and a message stating that the transfer process has been successful is presented at Step 706.

On the other hand, if the transfer process was unsuccessful due to an interruption, a message saying that the transfer process was unsuccessful is displayed (Step 800) as shown in FIG. 8. If a copy of the contents is present, a message stating that the contents can be reproduced from the analog output terminal 111 via the decoder 104 is displayed. In this case, sending the contents on the 1394 bus 20 via the digital I/F 108 is prohibited. In addition, regarding the contents having a restriction of analog copy, a process such as macro vision is applied to the contents sent from the analog output terminal 111 so that it can not be recorded in another stream recording device.

As described above, even if the move process fails, the contents can be played back. In the case of the contents without any restrictions in the analog copy, they can be recorded in other stream recording device using analog signals. In this case, the contents can be reproduced under the conditions of down-converting of the picture quality for a certain period or at a restricted number of frequencies.

If the transfer process is unsuccessful, a screen with selection options as in 801 can be shown to the users.

If the move process is interrupted, those copied in the separate memory can be deleted based on the percentage of the contents transferred relative to the entire contents (e.g., if one half or more of the contents have already been transferred).

Furthermore, if the STB 100 and the monitor 30 are integrated in the system, the contents copied in the separate memory can be reproduced only on the built-in monitor 30 instead of sending the contents outside via the digital I/F 108 and analog output terminal 111.

Information of the AV system which is currently located on the 1394 bus 20 which is acquired at Step 404 in FIG. 4 and at Step 506 in FIG. 5, an example of the method of checking whether the device connected at Step 405 in FIG. 4 and at Step 507 in FIG. 5 is the only move source device, will be explained.

If a device is connected on the 1394 bus 20, addresses from 0 to 62 called note ID, are automatically allocated for this device without overlapping with other devices. This allocated node ID may vary whenever the connection configuration changes. In the asynchronous communications used for control commands, communications are performed using the node ID. On the other hand, ordinary AV apparatuses such as STB 100 and DVTR 200 which are connected to the 1394 bus 20 have identifiers, such as specific, unique ID.

After acquiring the node ID present on the 1394 bus 20 in the Step 404 and Step 506 and checking that the node ID are only 0 or 1 at the Step 405 and Step 507, the presence of recording ability at the transfer destination device can be confirmed. Alternatively, after acquiring the unique ID of the entire system present on the 1394 bus 20 in the Step 404 and Step 506 and checking that the number of unique IDs acquired at Step 405 and Step 507 is 1, the presence of recording ability at the transfer destination device can be confirmed.

In addition to methods, a move process can be applied for a specific apparatus in order not to perform a transfer process for an unauthorized apparatus equipped with recording functions (e.g., a system having two recording media which can record at the same time). For example, a list 900 of devices subject to the transfer process as shown in FIG. 9 is loaded in the control unit 110 of the STB 100. In this list 900, information that can unconditionally specify the AV apparatuses subject to the transfer process, such as manufacturers' names and model names are registered. Subsequently, when node IDs of the AV apparatuses located on the 1394 bus 20 at Step 404 and Step 506 or unique IDs along with the information are acquired, and the fact that no other devices besides the transfer destination devices are connected at Step 405 and Step 507 is checked, it is necessary to confirm that the transfer destination devices are those registered in the list 900 subject to the transfer process in this embodiment. If a transfer destination device is the device registered in the list, a transfer process is executed, whereas if it is a non-registered device, a transfer process is interrupted. The contents of the list 900 subject to the transfer process are stored after applying the coding process in order to protect from external hackers. It is possible to upgrade the contents of the list 900 via broadcasting, Internet, IC cards, and special terminals.

As mentioned above, even though the authentication process is completed with devices other than the move destination devices before execution of the move, the move process can not be executed unless these devices are disconnected. Inevitably only a move source device (STB 100) and a move destination device (DVTR 200) are present on the 1394 bus 20 during the execution of the transfer so that unauthorized duplication using other devices can be easily prevented. The move destination device can be operated exactly in the same way as when recording the contents as the ordinary "copy one generation".

The contents subject to the transfer are copied in advance in a separate memory area before the execution of the transfer, and if the transfer process fails, the contents of the copy can be reproduced in an analog format so that the programs which should have been transferred for users can be left in an analog format.

In the present embodiments, STB 100 was used as a transfer source device, but DVTR 200 and DVD 300 can also be used as a such.

According to the present embodiment, the contents with restricted copying which are recorded once in a stream data recording/playback apparatus can be copied to another stream data recording/playback apparatus without concerns for creating an unauthorized copy. If copying of the stream data fails due to insufficient recording area and operational errors, analog reproduction is possible. Therefore, a system which is user friendly with high security is provided.

The present invention has been described in terms of specific embodiments. These specific embodiments may be modified without departing from the scope of the present invention. Accordingly, the appended claims should be used to interpret the scope of the present invention.

What is claimed is:

1. A broadcast receiving device configured to receive broadcasted digital programs, the device comprising:
 a tuner to select a channel from a plurality of channels, so that a desired digital program may be received via the selected channel;
 a recording component to record the received program and copy control information associated with the received program; a digital terminal to output the program recorded on the recording component to a video recording device coupled to the digital terminal; and a controller to control the output of the recorded program to the video recording device that is coupled to the digital terminal,
 wherein the controller determines a number of devices that are coupled to the digital terminal, and wherein the recorded program is not output for moving to the video recording device via the digital terminal if the controller detects more than one video recording device coupled to the digital terminal and if the copy control information of the recorded program imposes restriction on copying of the recorded program.

2. The broadcast receiving device of claim 1, wherein the broadcast receiving device is a set top box, and the copy control information includes a copy free mode, copy never mode, and copy one-generation mode.

3. The broadcast receiving device of claim 1, farther comprising:
 an input device to receive and process a user request to move the recorded program to the video recording device, the video recording device being a move destination device.

4. The broadcast receiving device of claim 1, wherein a message is displayed on a display device coupled to the broadcast receiving device that the recorded program cannot be moved to the video recording device if more than one video recording devices are coupled to the digital terminal.

5. The broadcast receiving device of claim 4, wherein the display device is a television.

6. The broadcast receiving device of claim 1, wherein the broadcast receiving device is a television.

7. The broadcast receiving device of claim 1, wherein the copy control information of the recorded program indicates that the recorded program is not to be copied again as a result of being recorded on the recording component.

8. The broadcast receiving device of claim 1, further comprising:
 an analog terminal to output analog signals; a recording medium to store the recorded program prior to moving the recorded program to the video recording device via the digital terminal;
 and a decoder to decode the recorded program stored on the recording medium,
 wherein the program-decoded by the decoder is outputted via the analog terminal if the move of the video recording device is not successful.

9. The broadcast receiving device of claim 8, wherein the program stored in the recording medium is deleted after the program is output via the analog terminal.

10. The broadcast receiving device of claim 8 wherein the program stored in the recording medium is outputted via the analog terminal under a restricted condition relating to a period allowed for playing the program or a number of times the program is permitted to be played.

11. The broadcast receiving device of claim 1 further comprising:
 an analog terminal to output an analog signal; and
 a decoder to decode the recorded program stored on the recording component,
 wherein the program decoded by the decoder is outputted via the analog terminal if the recorded program is not successfully moved to the video recording device via the digital terminal.

12. The broadcast receiving device of claim 1, wherein the recorded program outputted via the digital terminal involves a move process to the video recording device.

13. The broadcast receiving device of claim 12, wherein the broadcast receiving device is configured to prohibit a specific operation requested by a user from being performed while the recorded program is being moved via the digital terminal.

14. The broadcast receiving device of claim 1, wherein the broadcast receiving device is a set top box (STB) coupled to a television, wherein at least a portion of the recorded program is stored on a recording medium of the STB prior to moving the recorded program to the video recording device.

15. The broadcast receiving device of claim 14, wherein the recorded program stored in the recording medium is deleted once the recorded program has been moved successfully to the video recording device.

16. A digital video streaming device, comprising:
 a recording medium to store a digital video program, wherein copy control information is associated with the video program;
 a digital terminal to output the stored program to a move destination device that is coupled to the digital terminal; and
 a controller configured to determine a number of devices that are coupled to the digital terminal and confirm that only one move destination device is coupled to the digital terminal prior to allowing the stored program to be moved to the move destination device if the copy control information associated with the stored program imposes a copy restriction.

* * * * *

UNITED STATES PATENT AND TRADEMARK OFFICE
CERTIFICATE OF CORRECTION

PATENT NO. : 7,614,076 B2  Page 1 of 1
APPLICATION NO. : 10/969800
DATED : November 3, 2009
INVENTOR(S) : Ono et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1356 days.

Signed and Sealed this

Nineteenth Day of October, 2010

David J. Kappos
*Director of the United States Patent and Trademark Office*